(12) United States Patent
Baumgardt et al.

(10) Patent No.: US 8,608,106 B2
(45) Date of Patent: Dec. 17, 2013

(54) AIRCRAFT COOLING SYSTEM

(75) Inventors: Torben Baumgardt, Stade (DE); Ralf-Henning Stolte, Hamburg (DE); Volker Piezunka, Hamburg (DE); Uwe Wollrab, Soltau (DE)

(73) Assignee: Airbus Operations GmbH, Hamburg (DE)

(*) Notice: Subject to any disclaimer, the term of this patent is extended or adjusted under 35 U.S.C. 154(b) by 418 days.

(21) Appl. No.: 12/809,957

(22) PCT Filed: Nov. 21, 2008

(86) PCT No.: PCT/EP2008/009882
§ 371 (c)(1),
(2), (4) Date: Sep. 21, 2010

(87) PCT Pub. No.: WO2009/080168
PCT Pub. Date: Jul. 2, 2009

(65) Prior Publication Data
US 2011/0017426 A1    Jan. 27, 2011

Related U.S. Application Data

(60) Provisional application No. 61/015,232, filed on Dec. 20, 2007.

(30) Foreign Application Priority Data

Dec. 20, 2007 (DE) .......................... 10 2007 061 588

(51) Int. Cl.
*B64D 33/02* (2006.01)
(52) U.S. Cl.
USPC ........................................ 244/53 B

(58) Field of Classification Search
USPC ................................................... 244/53 B
See application file for complete search history.

(56) References Cited

U.S. PATENT DOCUMENTS 2,370,035 A * 2/1945 Heymann .................. 244/118.5
2,662,748 A   12/1953 Huber (Continued)

FOREIGN PATENT DOCUMENTS

DE    853 388      10/1952
DE    19619535     5/1996

(Continued)

OTHER PUBLICATIONS

International Search Report and Written Opinion, PCT/EP2008/009332, Airbus Deutschland GmbH, The International Searching Authority/European Patent Office, Jan. 4, 2009.
Machine-generated translation of Description of Published Patent No. DE19619535.

*Primary Examiner* — Tien Dinh
*Assistant Examiner* — Justin Benedik
(74) *Attorney, Agent, or Firm* — Krieg DeVault, LLP

(57) ABSTRACT

An aircraft cooling system (10) comprises a cooling element (12), which comprises a housing (14), a cooling air inlet (18) formed in the housing (14) and a plurality of heat exchangers (32, 34, 36, 38), which are disposed on lateral surfaces (24, 26, 28, 30) of the housing (14) and through which cooling air supplied through the cooling air inlet (18) may flow. A cooling air supply channel (40, 40') connects a cooling air supply opening (44, 44') formed in a tail section of an aircraft to the cooling air inlet (18) of the cooling element (12). A cooling air outlet channel (46) connects the heat exchangers (32, 34, 36, 38) of the cooling element (12) to a cooling air discharge opening (50).

20 Claims, 5 Drawing Sheets

(56) References Cited

U.S. PATENT DOCUMENTS

Figure 1:
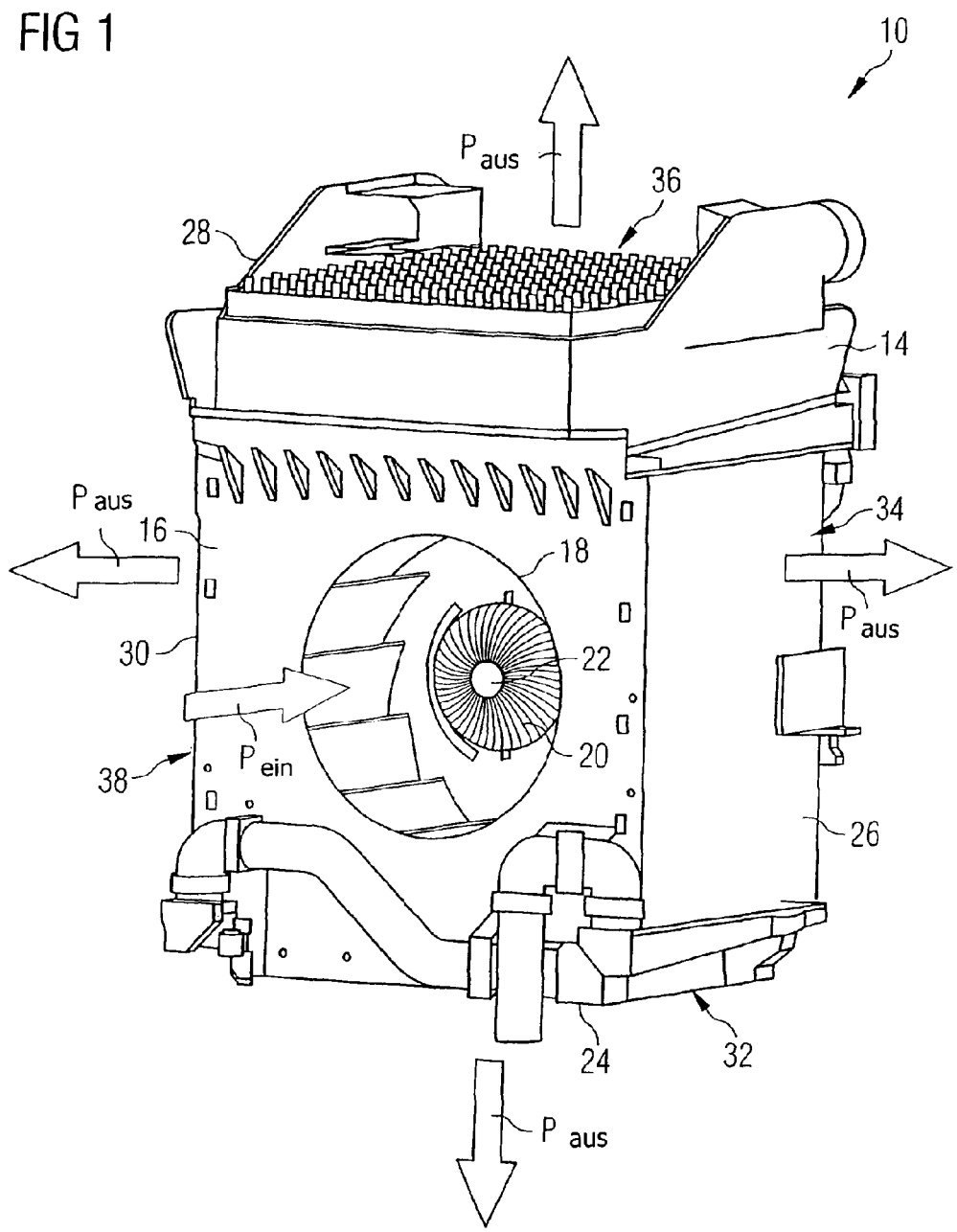

| | | | |
|---|---|---|---|
| 4,953,812 A * | 9/1990 | Van der Hoeven | 244/55 |
| 5,265,408 A * | 11/1993 | Sheoran et al. | 60/782 |
| 7,040,576 B2 * | 5/2006 | Noiseux et al. | 244/129.2 |
| 2002/0023730 A1 * | 2/2002 | Ehlers et al. | 165/41 |
| 2005/0274117 A1 * | 12/2005 | Sheoran et al. | 60/782 |
| 2006/0191676 A1 * | 8/2006 | Horn et al. | 165/202 |
| 2007/0063098 A1 | 3/2007 | Dionne | |
| 2009/0078496 A1 * | 3/2009 | Francisco et al. | 181/213 |

FOREIGN PATENT DOCUMENTS

| | | | |
|---|---|---|---|
| DE | 699 20 584 T2 | | 11/2005 |
| EP | 0 968 918 A2 | | 1/2000 |
| EP | 968918 | * | 5/2000 |
| EP | 1 045 217 A1 | | 10/2000 |
| EP | 1 860 026 A2 | | 11/2007 |
| JP | 2002 039011 A | | 2/2002 |
| RU | 2131380 | | 6/1999 |
| WO | 9316280 | | 8/1993 |
| WO | WO 03/037715 | * | 5/2003 |

* cited by examiner

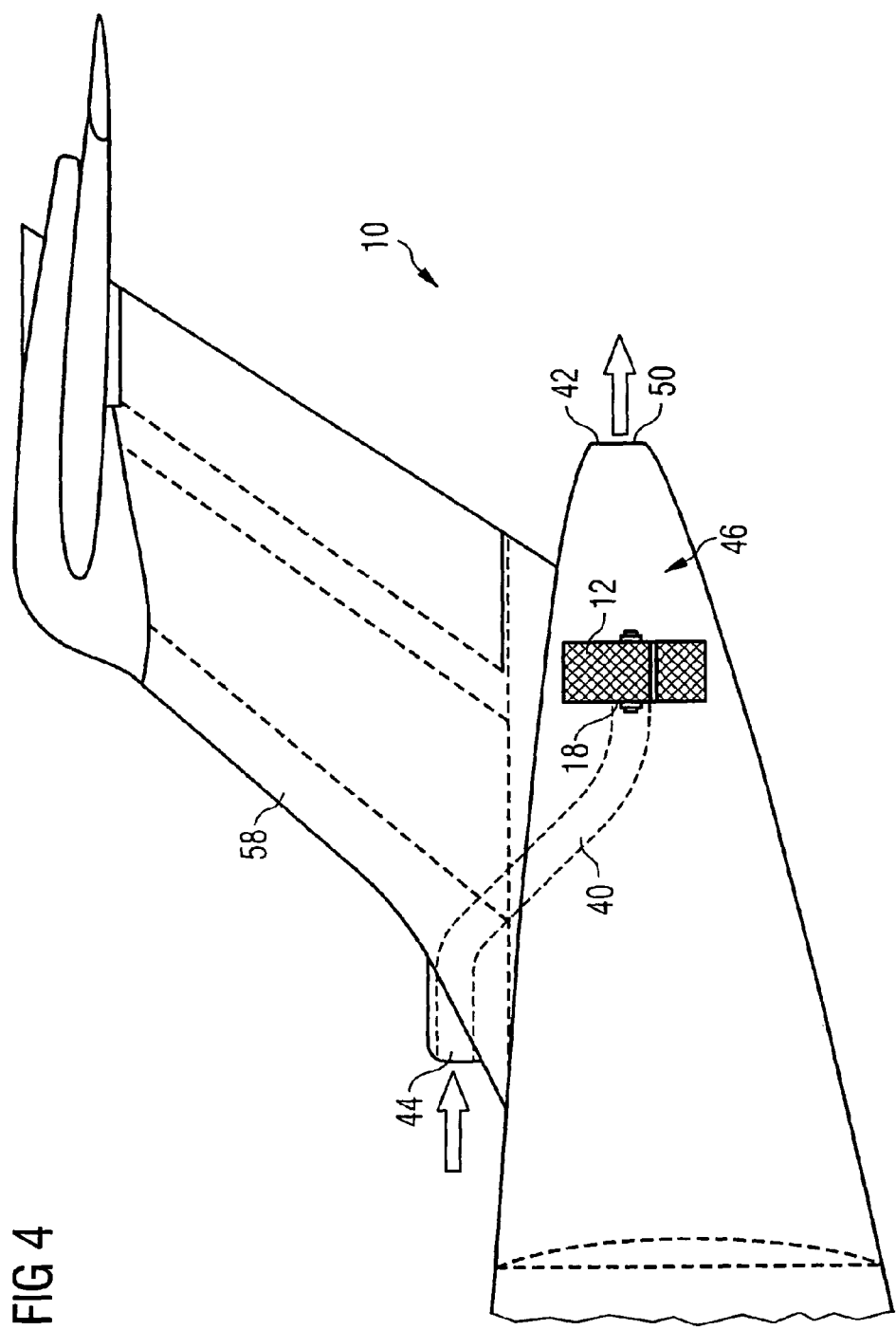

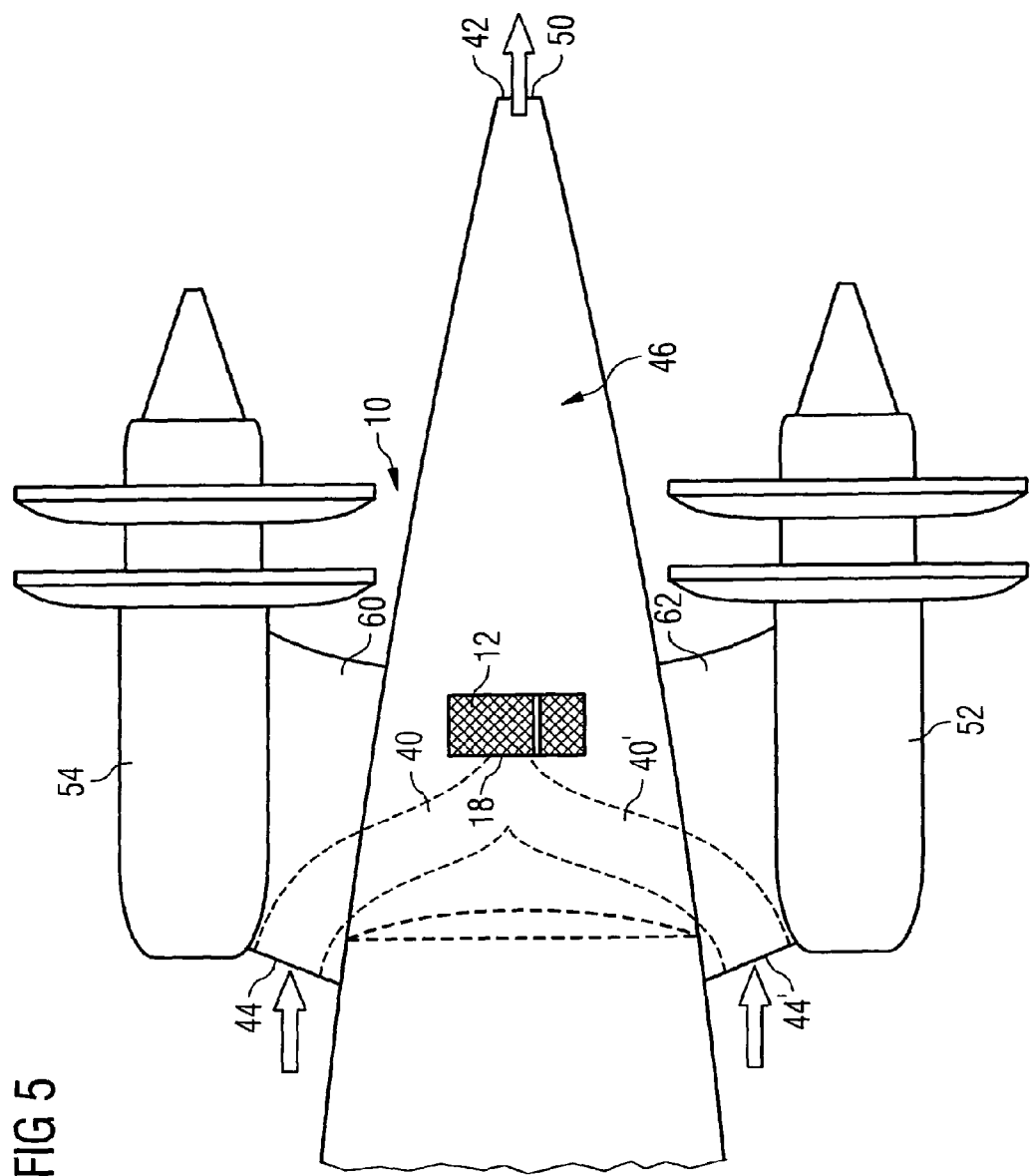

AIRCRAFT COOLING SYSTEM

The present application is a §371 national stage patent application of PCT/EP2008/009882, filed Nov. 21, 2008, which claims priority from German Patent Application No. 10 2007 061 588.6, filed Dec. 20, 2007 and claims the benefit of U.S. Provisional Patent Application No. 61/015,232, filed Dec. 20, 2007, each of which is incorporated herein by reference.

The invention relates to an aircraft cooling system that is suitable in particular for cooling a fuel cell system installed on board an aircraft.

Fuel cell systems enable low-emission, highly efficient generation of electric current. For this reason, efforts are currently being made to use fuel cell systems to generate electrical energy in various mobile applications, such as for example in automotive engineering or aeronautics. It is for example conceivable in an aircraft to replace the generators, which are currently used to supply power on board and are driven by the main engines or the auxiliary engine (APU), with a fuel cell system. A fuel cell system moreover might also be used to supply the aircraft with emergency power and replace the ram air turbine (RAT) hitherto used as an emergency power system.

Besides electrical energy, a fuel cell during operation generates thermal energy, which has to be removed from the fuel cell with the aid of a cooling system in order to prevent overheating of the fuel cell. A fuel cell system installed in an aircraft, for example for the on-board power supply, therefore has to be designed in such a way that it is capable of meeting a high demand for electrical energy. A fuel cell that has a high capacity for generating electrical energy however also generates a large amount of thermal energy and therefore has a high cooling requirement. On board an aircraft a large number of further technical devices are moreover provided, which generate heat and have to be cooled in order to guarantee a reliable mode of operation. These technical devices include for example the air conditioning units or the electronic components of the aircraft.

The present invention is directed to the object to provide an aircraft cooling system of a compact construction, which even at high ambient temperatures enables a reliable and efficient removal of high heat loads from a heat-generating device, for example a fuel cell system, on board an aircraft.

To achieve this object, an aircraft cooling system according to the invention comprises a cooling element that comprises a housing, a cooling air inlet formed in the housing and a plurality of heat exchangers, which are disposed on lateral surfaces of the housing and through which cooling air supplied through the cooling air inlet may flow. The cooling element may comprise for example a substantially cube-shaped or cuboidal housing. The cooling air inlet may then be formed for example in a lateral surface of the housing, while heat exchangers are arranged at a plurality or all of the other lateral surfaces of the housing.

In relation to its compact unit volume the cooling element has a large heat transfer area and is therefore notable for an excellent cooling capacity. Furthermore, by virtue of the distribution of the cooling air over a large heat transfer area, pressure losses in the cooling air flow passing through the cooling element may in an advantageous manner be kept low. The aircraft cooling system according to the invention is therefore operable in an extremely efficient manner and is capable of removing even high heat loads from a heat-generating device on board an aircraft.

A cooling air supply channel of the aircraft cooling system according to the invention connects a cooling air supply opening formed in a tail section of an aircraft to the cooling air inlet of the cooling element. Here, by a "tail section of an aircraft" is meant an aircraft region disposed at the tail side relative to the wings of the aircraft. The cooling air supply channel may be delimited by a pipe. However, given a corresponding arrangement of the cooling element and/or of the air inlet of the cooling element relative to the cooling air supply opening it is optionally also possible to dispense with a pipe for delimiting the cooling air supply channel.

While an aircraft is in flight, a relatively high pressure usually acts upon a nose section of the aircraft. In contrast thereto, a low pressure usually develops along the fuselage contour, around which air flows while the aircraft is flying. Finally, a pressure that is lower than the pressure acting upon the nose section of the aircraft but higher than the low pressure that arises along the fuselage contour, around which air flows, acts upon a cooling air supply opening formed in the tail section of the aircraft. The pressure conditions in the region of the cooling air supply opening may therefore be used in an advantageous manner to deliver ambient air through the cooling air supply opening and the cooling air supply channel to the cooling air inlet of the cooling element. At the same time, a cooling air supply opening formed in the tail section of the aircraft is less susceptible to fouling than a cooling air supply opening in the nose section of the aircraft that is exposed to a higher pressure while the aircraft is flying. Furthermore, a cooling air supply opening formed in the tail section of the aircraft may cause only a slight additional aerodynamic drag.

Finally, the aircraft cooling system according to the invention comprises a cooling air outlet channel that connects the heat exchangers of the cooling element to a cooling air discharge opening. The cooling air outlet channel is therefore used to feed cooling air, which has become warm after flowing through the heat exchangers of the cooling element, back into the environment. Like the cooling air supply channel, the cooling air outlet channel may also be delimited by a pipe. However, given a corresponding arrangement of the cooling element in the aircraft, it is optionally also possible to dispense with a pipe for delimiting the cooling air outlet channel.

The cooling air outlet channel is preferably formed in a region of the aircraft where, while the aircraft is flying, a pressure prevails that is lower than the pressure acting upon the cooling air supply opening while the aircraft is flying. The difference between the pressure acting upon the cooling air supply opening and the pressure prevailing in the region of the cooling air discharge opening may then be used in an advantageous manner to feed ambient air through the cooling air supply opening and the cooling air supply channel to the cooling air inlet of the cooling element and to discharge the cooling air, after it has flowed through the heat exchangers of the cooling element, through the cooling air outlet channel and the cooling air discharge opening back into the environment. The aircraft cooling system according to the invention is then notable for a reduced demand for electric power to drive a cooling air feed device.

The cooling element preferably comprises a fan disposed in the region of the cooling air inlet. The fan may be configured as a radial-flow fan, a diagonal-flow fan or, in the case of a shallow cooling element, a cross-flow fan. A configuration of the fan as an axial-flow fan is further conceivable. A fan preferably configured as a radial-flow fan is used to suck air flowing through the cooling air supply channel into the cooling air inlet of the cooling element and then force it in an—in relation to an axis of rotation of the radial-flow fan—radial direction through the heat exchangers disposed on the lateral surfaces of the cooling element housing. The fan may be configured as a compressor. With the aid of the fan a proper supply of cooling air to the cooling air inlet of the cooling element may be guaranteed even if the pressure conditions in the region of the cooling air supply opening and the cooling air discharge opening, for example during ground operation of the aircraft, do not allow an adequate delivery of cooling air through the cooling element.

In the cooling air supply channel of the aircraft cooling system according to the invention a further fan may be disposed. Like the cooling element fan, the further fan may also be configured as a radial-flow fan, a diagonal-flow fan or a cross-flow fan. A configuration of the fan as an axial-flow fan is further conceivable. The further fan is used to feed cooling air through the cooling air supply channel in the direction of the cooling air inlet formed in the cooling element housing. The further fan guarantees a high system redundancy as it enables an adequate supply of cooling air to the cooling air inlet of the cooling element even in the event of unfavourable pressure conditions in the region of the cooling air supply opening and/or the cooling air discharge opening and/or in the event of failure of the cooling element fan. Thus, in all operating states of the aircraft, i.e. also during ground operation, an optimum performance of the aircraft cooling system is guaranteed. It is moreover possible, for example during ground operation of the aircraft, to use the further fan instead of the fan of the cooling element to feed cooling air and hence optionally reduce noise emissions.

The cooling air supply opening of the aircraft cooling system according to the invention may be disposed in the region of a tail face of the aircraft. While the aircraft is flying, the cooling air, before entering a cooling air supply opening disposed in the region of an aircraft tail face, flows along the aircraft contour counter to the direction of flight. Consequently, a cooling air supply opening disposed in the region of an aircraft tail face is subject to only a low risk of icing while the aircraft is flying. The cooling air discharge opening may be disposed in the region of a fuselage lower shell. Preferably, the cooling air discharge opening is disposed in a portion of the fuselage lower shell that is situated adjacent to the cooling element or at least in the vicinity thereof. A cooling air supply opening disposed in the region of an aircraft tail face and a cooling air discharge opening disposed in the region of a fuselage lower shell enable optimum utilization of the pressure difference between the cooling air supply opening and the cooling air discharge opening. Particularly good protection against fouling is moreover guaranteed.

In an alternative form of construction of the aircraft cooling system according to the invention, the cooling air supply opening may be disposed in the region of a rudder unit or an engine pylon of the aircraft. For example, the cooling air supply opening may be disposed in the region of a leading edge of the rudder unit or in the region of a leading edge of an engine pylon that is used to fasten an engine to the fuselage in the tail section of the aircraft. The aircraft cooling system according to the invention may comprise only one cooling air supply opening. If desired, it is however also possible to provide two or more cooling air supply openings. For example, two engine pylons that are each used to fasten an engine to the fuselage may each be provided with a cooling air supply opening. Preferably each cooling air supply opening is connected by a corresponding cooling air supply channel to the air inlet of the cooling element.

The cooling air supply channel may be configured in the form of a ram air channel. The cooling air supply opening may then be designed for example as a NACA (National Advisory Committee for Aeronautics) cooling air supply opening. The cooling air supply channel configured as a ram air channel may moreover comprise a diffuser. While the aircraft is flying, cooling air entering the cooling air supply channel through the cooling air supply opening then flows through the cooling air supply channel at a flow rate that slows down in the region of the diffuser. Consequently, in the diffuser a dynamic component of the pressure is partially converted to static pressure, so that compared to the ambient pressure a static overpressure also referred to as ram pressure arises. This ram pressure brings about and/or assists the flow of the cooling air in the direction of the cooling element and/or through the heat exchangers of the cooling element.

For controlling the cooling air flow through the cooling air supply opening, the cooling air supply opening may be equipped with a closure element configured for example in the form of a flap. The closure element is preferably devised so as, if need be, either to close the cooling air supply opening or to open a desired cross section of flow thereof. Preferably the closure element enables an infinite adjustment of the cross section of flow of the cooling air supply opening. In a similar fashion the cooling air discharge opening may be provided with a closure element configured for example likewise in the form of a flap. The closure element of the cooling air discharge opening may, like the closure element of the cooling air supply opening, be devised so as either to close or, if need be, fully or partially to open the cross section of flow of the cooling air discharge opening. Preferably, an infinite adjustment of the cross section of flow of the cooling air discharge opening is likewise possible. By means of the closure elements the adjustment of the desired pressure conditions in the region of the cooling air supply opening and the cooling air discharge opening may be assisted.

The cooling air supply opening may be configured in the form of a superficially flush, frontally disposed scoop-type cooling air supply opening. Such a design of the cooling air supply opening is expedient particularly if the cooling air supply opening is disposed in the region of the aircraft rudder unit or in the region of an engine pylon of the aircraft.

In the cooling air supply channel a cooling air mass flow deflection device may be disposed. The cooling air mass flow deflection device is preferably devised so as in a first position to guide the cooling air mass flow flowing through the cooling air supply channel in the direction of the cooling air inlet of the cooling element. In a second position the cooling air mass flow deflection device on the other hand is preferably devised so as to guide the cooling air mass flow flowing through the cooling air supply channel past the cooling element and for example in the direction of a further redundant cooling element. The further redundant cooling element may be of the same construction as the cooling element. For example, the cooling air mass flow deflection device is devised so as, in the event of failure of the cooling element of the aircraft cooling system according to the invention, to be moved into its second position in order to guide the cooling air mass flow flowing through the cooling air supply channel in the direction of the further redundant cooling element and hence ensure proper functioning of the aircraft cooling system according to the invention even in the event of failure of the cooling element. The cooling air mass flow deflection device may be movable between its first and its second position with the aid of an electric motor. For redundancy reasons, two electric motors that may be disposed for example on a common shaft may be provided in order, if need be, to move the cooling air mass flow deflection device between its first and its second position.

The aircraft cooling system according to the invention may further comprise a device for utilizing the heat stored in the cooling air after flowing through the heat exchangers of the cooling element. The device for utilizing the heat stored in the cooling air after flowing through the heat exchangers of the cooling element may be for example an engine preheating device, a fuel preheating device or a device for injecting water into an aircraft engine. The cooling air that has become warm after flowing through the heat exchangers of the cooling element may be used for example directly to preheat an engine disposed in the tail section of the aircraft. Alternatively, in the engine preheating device the heat stored in the cooling air may merely be transferred, for example by means of a heat exchanger, to a further medium for preheating the engine. In a similar fashion, the cooling air that has become warm after flowing through the heat exchangers of the cooling element may be used directly to preheat fuel that is to be supplied to the engines of the aircraft or to a fuel cell system provided on board the aircraft. Alternatively, however, in the fuel preheating device the heat stored in the cooling air may once more merely be transferred, for example by means of a suitable heat exchanger, to a further medium for preheating the fuel. In a device for heating water that is to be injected into an aircraft engine, the heat stored in the cooling air after flowing through the heat exchangers of the cooling element may be used in an advantageous manner either directly or indirectly to preheat the water to be injected into the engine or to protect water-carrying pipes of the water injection device from icing.

In a particularly preferred form of construction of the aircraft cooling system according to the invention, at least one heat exchanger of the cooling element is integrated into a cooling circuit of a fuel cell system, i.e. a cooling circuit that is used to remove waste heat, which arises during operation of the fuel cell, from the fuel cell. Because of its high cooling capacity the aircraft cooling system according to the invention is capable of reliably removing the high heat loads, which arise during operation of a fuel cell, from the fuel cell. The heat exchangers of the cooling element may in this case take the form of redundant devices in order to guarantee proper cooling of the fuel cell system even in the event of failure of one or more heat exchangers of the cooling element.

Additionally or alternatively thereto, it is further possible to integrate one or more heat exchangers of the cooling element into a cooling circuit of an aircraft air conditioning system, an engine cooling circuit, a cooling circuit for water condensation and water generation and/or a cooling circuit for cooling electronic components on board the aircraft. The aircraft cooling system according to the invention, which may be used for example primarily to supply the necessary cooling energy to a fuel cell system on board the aircraft, may therefore in an advantageous manner be combined with other cooling systems on board the aircraft and hence provide cooling capacity also to other consumers.

In principle, the heat exchangers of the cooling element may be integrated directly into the cooling circuits of various cooling systems provided on board the aircraft. Alternatively, however, the transfer of cooling energy to intercoolers is also conceivable. The use of intercoolers is meaningful particularly if, for safety reasons, a heat exchanger of the cooling element is not to be integrated directly into a cooling circuit of a cooling system, for example an oil cooling circuit, provided on board the aircraft. Particularly if the heat exchangers of the cooling element are integrated into an engine cooling circuit, the line arrangement has to be such that in all operating states a proper cooling function is guaranteed and for example a damaging of the lines by engine parts or the like is ruled out. The aircraft cooling system according to the invention may be designed in dependence upon the demands placed upon its cooling capacity and may be fashioned along modular principles. Furthermore, an optimum adaptation of the system to the structures surrounding the system is possible.

The aircraft cooling system according to the invention preferably further comprises a device for influencing flow at an engine pylon. The device for influencing flow may be connected to the cooling air outlet channel and/or the cooling air discharge opening. Alternatively, the device for influencing flow may be connected directly to the heat exchangers of the cooling element in order to receive cooling air passing out of the heat exchangers and feed it to one or more engine pylons. By virtue of a purposeful influencing of the flow in the region of an engine pylon, an advantageous reduction of the noise immissions may be realized.

Figure 2:
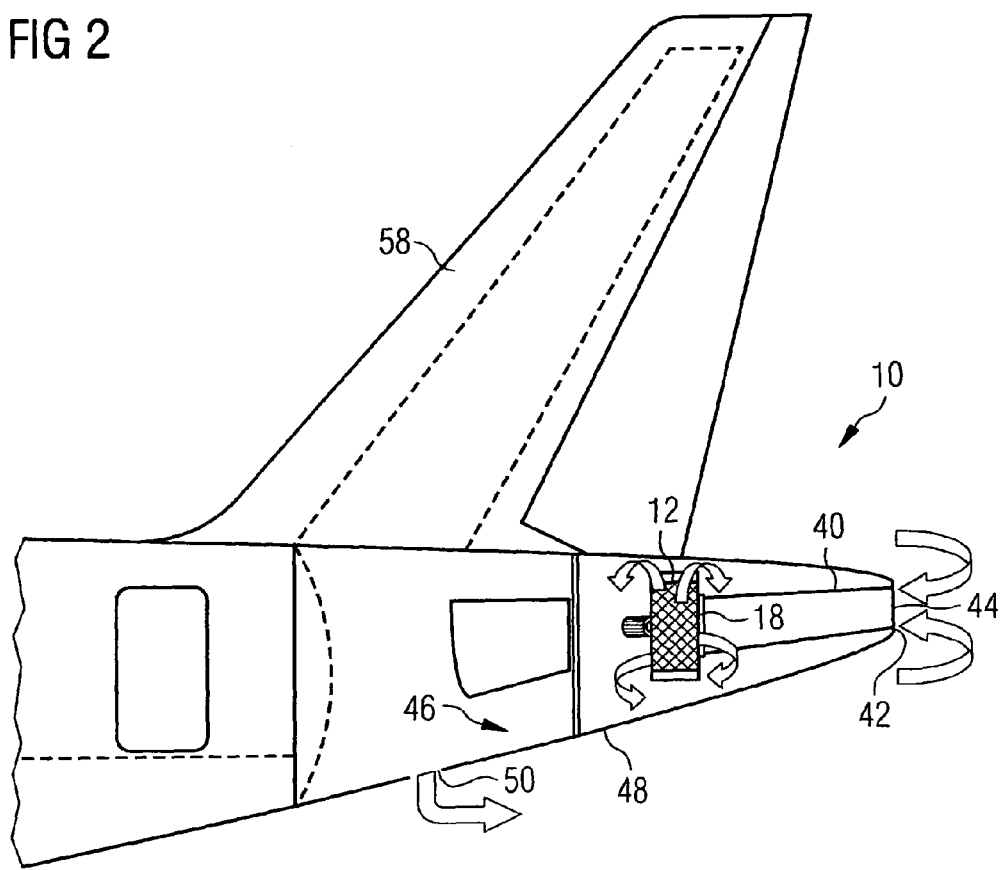
Figure 3:
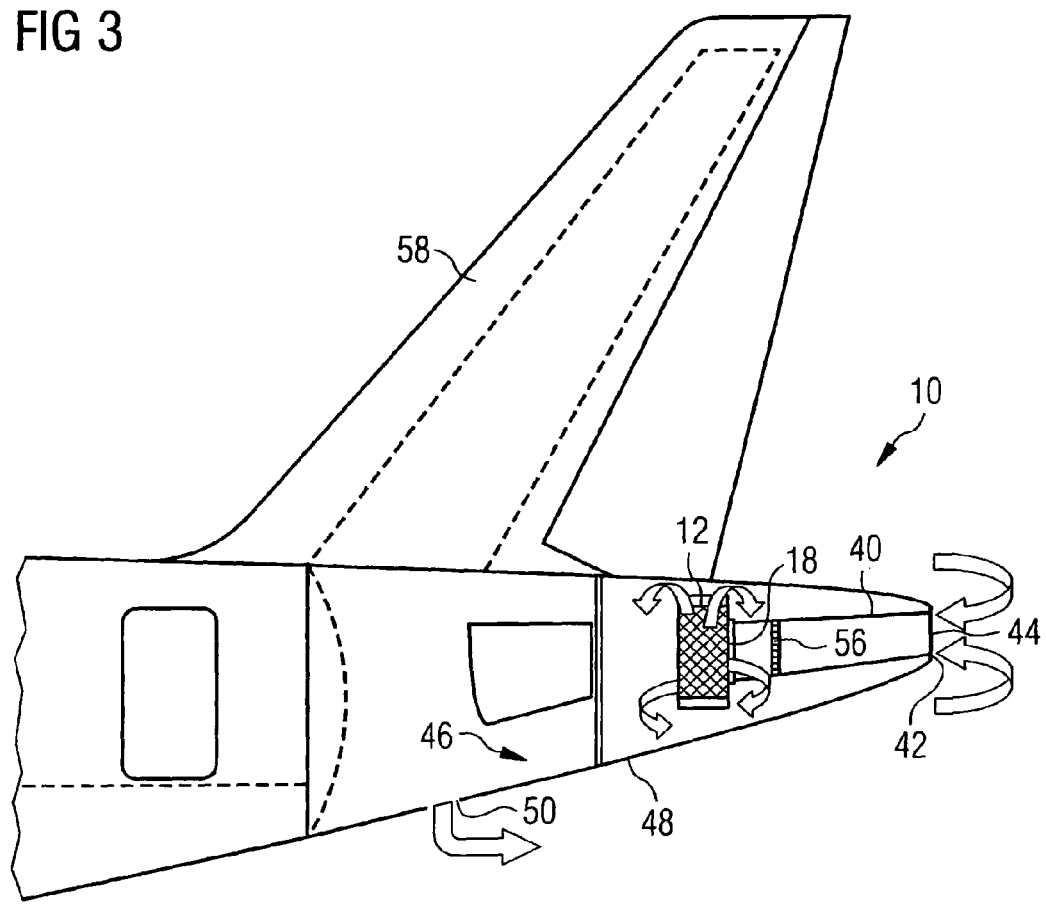

There now follows a detailed description of three preferred embodiments of an aircraft cooling system according to the invention with reference to the accompanying diagrammatic drawings, which show in FIG. 1 a three-dimensional view of a cooling element of an aircraft cooling system, FIG. 2 an aircraft cooling system with a cooling air supply opening disposed in the region of an aircraft tail face, FIG. 3 an aircraft cooling system with a cooling air supply opening disposed in the region of an aircraft tail face and with an axial-flow fan disposed in a cooling air supply channel, FIG. 4 an aircraft cooling system with a cooling air supply opening disposed in the region of a rudder unit, and FIG. 5 an aircraft cooling system with two cooling air supply openings disposed in the region of two engine pylons.

FIG. 1 shows a cooling element 12 that is suitable for use in an aircraft cooling system 10 illustrated in FIGS. 2 to 5. The cooling element 12 comprises a substantially cuboidal housing 14. A front lateral surface 16 of the cooling element 12 is provided with a cooling air inlet 18. In the region of the cooling air inlet 18 a radial-flow fan 20 is disposed. The radial-flow fan 20 is used to suck cooling air in the direction of the cooling air inlet 18, as indicated by the arrow $P_{in}$ in FIG. 1, and then force it radially outwards in relation to an axis of rotation 22 of the radial-flow fan 20, as indicated by the arrows $P_{out}$ in FIG. 1. Lateral surfaces 24, 26, 28, 30 of the cooling element 12 that adjoin the front lateral surface 16 are provided respectively with heat exchangers 32, 34, 36, 38. Cooling air passing through the cooling air inlet 18 into the housing 14 of the cooling element 12 flows through the heat exchangers 32, 34, 36, 38 and, in so doing, with relatively low pressure losses transfers cooling energy to a medium to be cooled, which flows through cooling channels of the heat exchangers.

As FIGS. 2 to 5 reveal, the cooling element 12 of the aircraft cooling system 10 is disposed in a tail section of the fuselage. This arrangement of the cooling element 12 is expedient as the aircraft cooling system 10 is used to cool a fuel cell system, which replaces an APU of the aircraft and is not shown in the figures. The installation space in a tail section of the fuselage that is conventionally used to receive the APU may therefore be used as installation space for the cooling element 12 of the aircraft cooling system 10.

In the aircraft cooling system 10 shown in FIG. 2, the cooling air inlet 18 of the cooling element 12 is connected to a cooling air supply channel 40 configured in the form of a ram air channel. The cooling air supply channel 40 opens into a cooling air supply opening 44 formed in the region of an aircraft tail face 42. The cooling air supply opening 44 is provided with a closure element configured in the form of a flap, which is used to close the cooling air supply opening 44 or to open a desired variable cross section of flow thereof.

The cooling air supplied through the cooling air supply channel 40 to the cooling element 12, after flowing through the heat exchangers 32, 34, 36, 38 of the cooling element 12, is guided through a cooling air outlet channel 46 to a cooling air discharge opening 50 formed in a fuselage lower shell 48. Like the cooling air supply opening 44, the cooling air discharge opening 50 is provided with a closure element configured in the form of a flap, which is used either to close the cooling air discharge opening 50 or to open a desired variable cross section of flow thereof.

While the aircraft is flying, a higher pressure acts upon the cooling air supply opening 44 disposed in the region of the tail face 42 of the aircraft than upon the cooling air discharge opening 50 formed in the fuselage lower shell 48. This pressure difference may be used in an advantageous manner to feed the cooling air through the cooling element 12 of the aircraft cooling system 10. During ground operation of the aircraft the radial-flow fan 20 of the cooling element 12 ensures a proper supply of cooling air to the cooling element 12. The cooling air supply opening 44 formed in the region of the aircraft tail face 42 is less susceptible to fouling than a cooling air supply opening disposed in a nose section of the aircraft. Furthermore, because of the flow conditions in the region of the cooling air supply opening 44, i.e. because the cooling air flows in a direction counter to the direction of flight prior to entering the cooling air supply opening 44, there is a reduced risk of icing. Finally, the cooling air supply opening 44 disposed in the region of the aircraft tail face 42 may have a low additional aerodynamic drag.

As already mentioned, the aircraft cooling system 10 is used as a cooling system for a fuel cell system disposed on board the aircraft. At least two heat exchangers 32, 34 of the cooling element 12 are therefore integrated into a cooling circuit for cooling a fuel cell, wherein the heat exchangers 32, 34 serve as redundant cooling devices. Consequently, even in the event of failure of one heat exchanger 32, 34, a proper cooling of the fuel cell system and in particular of the fuel cell provided in the fuel cell system is guaranteed by the other heat exchanger 34, 32.

The remaining heat exchangers 36, 38 of the cooling element 12 are integrated into a circuit of an aircraft air conditioning system and into an engine cooling circuit. Alternatively, the heat exchangers 36, 38 may be integrated into a cooling circuit for cooling electronic components on board the aircraft or into any other cooling circuit provided on board the aircraft. The cooling capacity generated by the aircraft cooling system 10 may therefore be supplied to a plurality of consumers on board the aircraft. The heat exchangers 36, 38 may be integrated directly into the corresponding cooling circuits. However, should it be necessary for safety reasons or desirable for other reasons, the heat exchangers 36, 38 of the cooling element 12 may also be coupled thermally to an intercooler in order to transfer cooling energy indirectly via the intercooler to the cooling circuits.

Disposed in the cooling air supply channel 40 is a cooling air mass flow deflection device, which is not shown in FIG. 2. In a first position the electric motor-operated cooling air mass flow deflection device guides the cooling air flowing through the cooling air supply channel 40 in the direction of the cooling element 12. In a second position, on the other hand, the cooling air mass flow deflection device blocks off the cooling element 12 from the cooling air supply channel 40 and ensures that the cooling air flowing through the cooling air supply channel 40 is guided to a further redundant cooling element 12, which is not shown in FIG. 2. Thus, even in the event of failure of the cooling element 12, proper functioning of the aircraft cooling system 10 is guaranteed.

The cooling air, which has become warm after flowing through the heat exchangers 32, 34, 36, 38 of the cooling element 12, is used to preheat two engines 52, 54, which are represented only in FIG. 5 and disposed in the tail section of the aircraft, and to preheat fuel that is to be supplied to the engines 52, 54. The cooling air that is heated as it flows through the heat exchangers 32, 34, 36, 38 of the cooling element 12 is moreover used in a water injection device to preheat water, which is to be injected into the engines 52, 54 to reduce emissions, and to protect water-carrying pipes of the water injection device against icing.

The aircraft cooling system 10 shown in FIG. 3 differs from the arrangement represented in FIG. 2 in that an axial-flow fan 56 is additionally disposed in the cooling air supply channel 40. The axial-flow fan 56 assists the flow of cooling air through the cooling air supply channel 40 in the direction of the cooling air inlet 18 of the cooling element 12. The axial-flow fan 56 therefore provides a specific redundancy with regard to the radial-flow fan 20 of the cooling element 12 and also ensures an adequate cooling air mass flow during ground operation of the aircraft, when no pressure differences between the cooling air supply opening 44 and the cooling air discharge opening 50 may be used to feed the cooling air through the cooling element 12. Otherwise, the construction and the mode of operation of the aircraft cooling system 10 shown in FIG. 3 correspond to the construction and mode of operation of the arrangement according to FIG. 2.

Unlike in the arrangement represented in FIGS. 2 and 3, in the aircraft cooling system 10 illustrated in FIG. 4 the cooling air supply opening 44 is disposed in the region of a leading edge of the aircraft rudder unit 58. The cooling air supply opening 44 may be configured in the form of a superficially flush scoop-type cooling air supply opening or may take the form of a pitot- and/or ram air inlet. The cooling air discharge opening 50 on the other hand is situated in the region of the aircraft tail face 42. With this arrangement too, while the aircraft is flying, a difference between the pressure acting upon the cooling air supply opening 44 and the pressure prevailing in the region of the cooling air discharge opening 50 may be used to feed the cooling air mass flow through the cooling element 12. Otherwise, the construction and the mode of operation of the aircraft cooling system 10 shown in FIG. 4 correspond to the construction and the operation of the arrangements to shown in FIGS. 2 and 3.

Finally, the aircraft cooling system 10 represented in FIG. 5 differs from the arrangement according to FIG. 4 in that the aircraft cooling system 10 comprises, instead of a cooling air supply opening 44 disposed in the region of the rudder unit 58 of the aircraft, two cooling air supply openings 44, 44' that are formed in two pylons 60, 62 carrying the engines 52, 54. The cooling air supply openings 44, 44' are connected by two cooling air supply channels 40, 40' to the cooling air inlet 18 of the cooling element 12. Discharging of the cooling air is effected, as in the arrangement shown in FIG. 4, through a cooling air discharge opening 50 formed in the region of the aircraft tail face 42. Here too, while the aircraft is flying, a pressure difference between the cooling air supply openings 44, 44' and the cooling air discharge opening 50 may be used to feed the cooling air mass flow through the cooling element 12. Some of the discharge air may also be used simultaneously to influence the flow at the engine carriers for example by means of air expulsion.

The invention claimed is:

1. Aircraft having an aircraft cooling system, which comprises:
   a cooling element,
   a cooling air supply channel that connects a cooling air supply opening formed in the region of a tail face of the aircraft to a cooling air inlet of the cooling element, and a cooling air outlet channel, characterized in that the cooling element comprises a housing, the cooling air inlet formed in the housing and a plurality of heat exchangers, which are disposed on lateral surfaces of the housing and through which cooling air supplied through the cooling air inlet may flow, and that the cooling air outlet channel connects the heat exchangers of the cooling element to a cooling air discharge opening that is disposed in a region of a fuselage lower shell, upon which, while the aircraft is flying, a lower pressure acts than upon the cooling air supply opening disposed in the furthest aft region of the tail face of the aircraft.

2. Aircraft according to claim 1, characterized in that the cooling element further comprises a fan disposed in the region of the cooling air inlet.

3. Aircraft according to claim 2, characterized in that in the cooling air supply channel a further fan is disposed.

4. Aircraft according to claim 2, characterized in that the cooling air supply channel is configured in the form of a ram air channel.

5. Aircraft according to claim 2, characterized in that the cooling air supply opening is configured in the form of a scoop-type air supply opening.

6. Aircraft according to claim 2, characterized in that disposed in the cooling air supply channel is a cooling air mass flow deflection device, which is devised so as in a first position to guide the cooling air mass flow flowing through the cooling air supply channel in the direction of the cooling air inlet of the cooling element, and in a second position to guide the cooling air mass flow flowing through the cooling air supply channel past the cooling element.

7. Aircraft according to claim 1, characterized in that in the cooling air supply channel a further fan is disposed.

8. Aircraft according to claim 7, characterized in that the cooling air supply channel is configured in the form of a ram air channel.

9. Aircraft according to claim 7, characterized in that the cooling air supply opening is configured in the form of a scoop-type air supply opening.

10. Aircraft according to claim 7, characterized in that disposed in the cooling air supply channel is a cooling air mass flow deflection device, which is devised so as in a first position to guide the cooling air mass flow flowing through the cooling air supply channel in the direction of the cooling air inlet of the cooling element, and in a second position to guide the cooling air mass flow flowing through the cooling air supply channel past the cooling element.

11. Aircraft according to claim 1, characterized in that the cooling air supply channel is configured in the form of a ram air channel.

12. Aircraft according to claim 11, characterized in that the cooling air supply opening is configured in the form of a scoop-type air supply opening.

13. Aircraft according to claim 11, characterized in that disposed in the cooling air supply channel is a cooling air mass flow deflection device, which is devised so as in a first position to guide the cooling air mass flow flowing through the cooling air supply channel in the direction of the cooling air inlet of the cooling element, and in a second position to guide the cooling air mass flow flowing through the cooling air supply channel past the cooling element.

14. Aircraft according to claim 1, characterized in that the cooling air supply opening is configured in the form of a scoop-type air supply opening.

15. Aircraft according to claim 5, characterized in that disposed in the cooling air supply channel is a cooling air mass flow deflection device, which is devised so as in a first position to guide the cooling air mass flow flowing through the cooling air supply channel in the direction of the cooling air inlet of the cooling element, and in a second position to guide the cooling air mass flow flowing through the cooling air supply channel past the cooling element.

16. Aircraft according to claim 1, characterized in that disposed in the cooling air supply channel is a cooling air mass flow deflection device, which is devised so as in a first position to guide the cooling air mass flow flowing through the cooling air supply channel in the direction of the cooling air inlet of the cooling element, and in a second position to guide the cooling air mass flow flowing through the cooling air supply channel past the cooling element.

17. Aircraft according to claim 1, characterized by a device for utilizing the heat stored in the cooling air after flowing through the heat exchangers of the cooling element.

18. Aircraft according to claim 17, characterized in that the device for utilizing the heat stored in the cooling air after flowing through the heat exchangers of the cooling element is an engine preheating device, a fuel preheating device or a device for heating water that is to be injected into an aircraft engine.

19. Aircraft according to claim 1, characterized in that the heat exchangers of the cooling element are integrated into a cooling circuit of a fuel cell system, a cooling circuit of an aircraft air conditioning system, an engine cooling circuit, a cooling circuit for water condensation and water generation and/or a cooling circuit for cooling electronic components on board the aircraft.

20. Aircraft according to claim 1, characterized by a device, which is connected to the cooling air outlet channel, for influencing flow at an engine pylon.

* * * * *